Jan. 6, 1959 A. M. BLOOM 2,867,163
ROASTING MACHINE FOR HAMBURGER PATTIES, OR THE LIKE
Filed May 9, 1955 4 Sheets-Sheet 2

INVENTOR,
ABE M. BLOOM
BY Flam and Flam
ATTORNEYS

Jan. 6, 1959  A. M. BLOOM  2,867,163
ROASTING MACHINE FOR HAMBURGER PATTIES, OR THE LIKE
Filed May 9, 1955  4 Sheets-Sheet 3
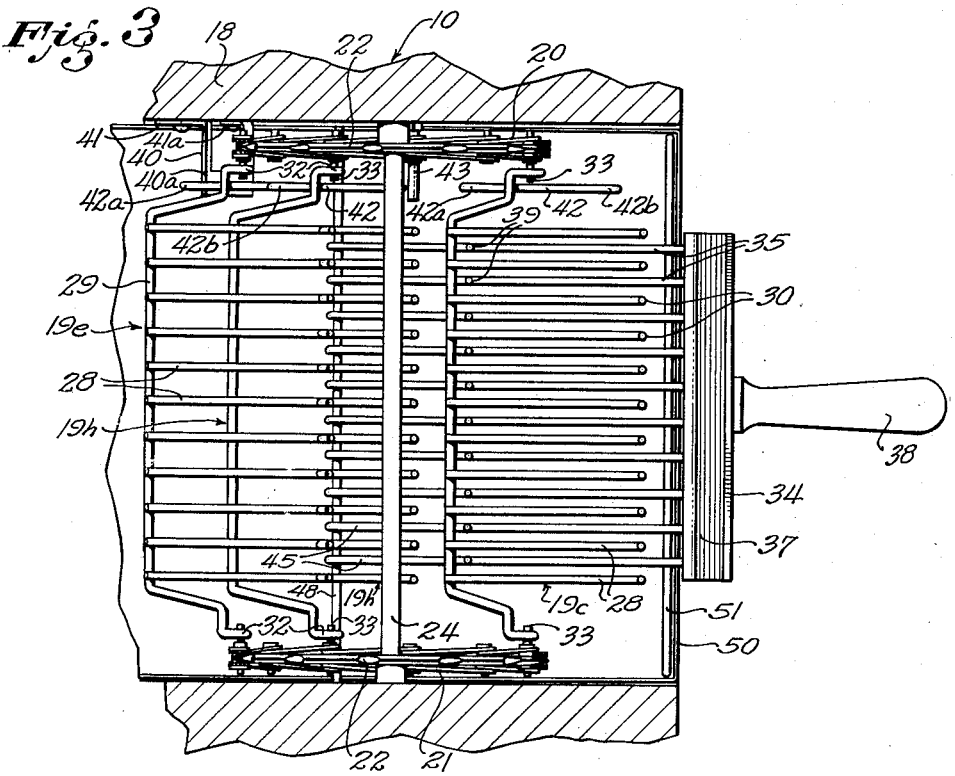
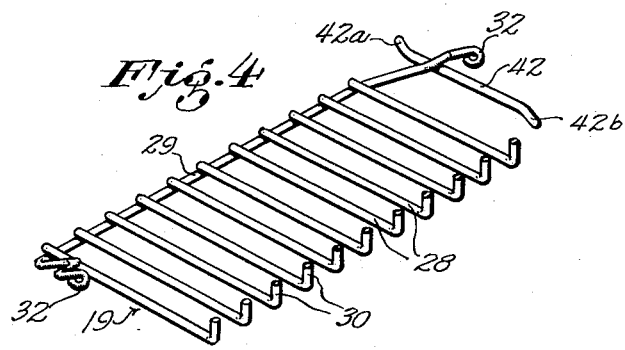
INVENTOR,
ABE M. BLOOM
BY Flam and Flam
ATTORNEYS.

Jan. 6, 1959  A. M. BLOOM  2,867,163
ROASTING MACHINE FOR HAMBURGER PATTIES, OR THE LIKE
Filed May 9, 1955  4 Sheets-Sheet 4
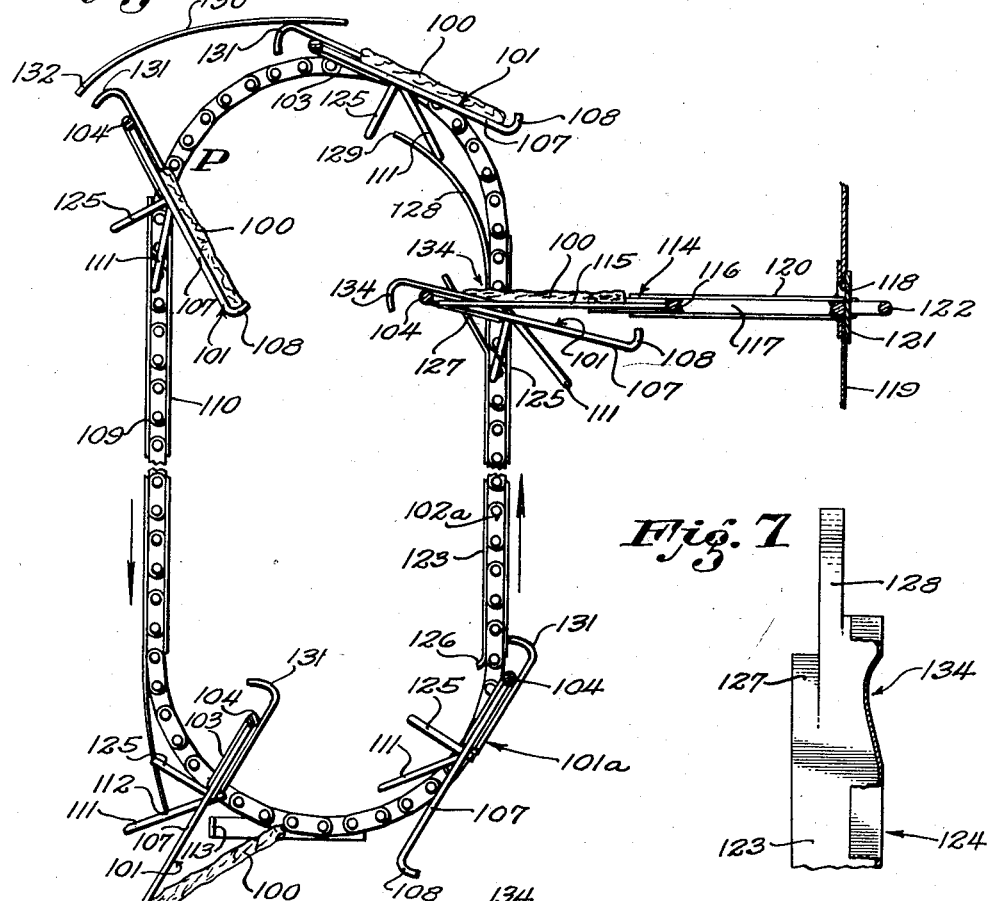
INVENTOR,
ABE M. BLOOM
By Flam and Flam
ATTORNEYS.

United States Patent Office 2,867,163
Patented Jan. 6, 1959

2,867,163

ROASTING MACHINE FOR HAMBURGER PATTIES, OR THE LIKE

Abe M. Bloom, Van Nuys, Calif.

Application May 9, 1955, Serial No. 506,938

5 Claims. (Cl. 99—386)

This invention relates to apparatus for roasting and broiling food, such as meat patties, and the like, for use especially by purveyors or caterers.

Apparatus of this general character is shown and described in my Patent No. 2,705,913, issued April 12, 1955, and entitled, Wiener Roasting Machine. This application is a continuation-in-part of my copending application, Serial No. 391,968, filed November 13, 1953, and entitled, Roasting Machine for Wieners, Hamburger Patties, or the Like.

It is important that the apparatus utilize the advertising value of the sight of cooking food to attract potential cusomers. Accordingly, in embodiments of the present invention, the apparatus is enclosed in a glass case, and the cooking food is within the full sight of the customers. To provide such an apparatus in a compact manner, use is made of an endless conveyor having spaced vertical runs, one of the runs passing between heating elements.

It is an object of the present invention to provide an improved apparatus of this character.

It is another object of this invention to provide novel means for definitely locating the food articles with respect to the heating elements. For this purpose, use is made of guides cooperating with individual pivoted carriages carrying the food. The load on the carriage exerts a torque maintaining the cradles in guided relationship.

It is another object of this invention to provide a simple apparatus including a vertical conveyor for uniformly and effectively cooking flat food articles, such as hamburgers. For this purpose, the carriage structures are guided in such manner that the food article inclines only slightly from the vertical direction of movement thereof as they pass between heating elements, so that one side of the article receives radiation from the heating elements on one side of the conveyor run, and the other side of the article receives radiation from the heating elements on the other side of the conveyor run.

In order to permit such orientation of the food articles, such as meat patties, during broiling, it is essential that some measures be taken to insure that the patties do not sag under their own weight. It is an object of this invention to precook the food articles while they are in a horizontal orientation in order that they attain a sufficient measure of cohesiveness and rigidity in advance of movement in a vertical orientation between the heating elements. Also, precooking achieves a uniformity of the food articles before the intense cooking operation. By these means, the extent of cooking of the articles is accurately controlled.

It is still another object of this invention to provide a device of this character that can readily be cleaned. For this purpose, the operative mechanism for moving the conveyor is enclosed, and the parts exposed in the cooking area are few and simple.

It is still another object of this invention to provide a roasting and broiling device that ensures a uniform high quality cooking of food articles.

It is still another object of this invention to provide a novel carriage structure for cooking flat food articles, such as hamburgers, and that operates in a novel manner to discharge the items from the carriages after cooking. In one form of the invention, the food article is forced from the carriage by a series of fingers formed on a chute, and the carriage simultaneously inverted. In another form of the invention, the carriages are so supported that the weight of the food article causes the carriage to discharge the article, such discharge being permitted upon passage of the carriage beyond guides that otherwise maintain the carriage in a definite food retaining position.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 3 is a fragmentary sectional view, taken along the plane indicated by line 3—3 of Fig. 2;

Fig. 4 is a pictorial view of one of the food carriages;

Fig. 5 is a fragmentary sectional view similar to Fig. 3, showing a modified form of the present invention;

Fig. 6 is a fragmentary top plan view of the apparatus shown in Fig. 5; and

Fig. 7 is a fragmentary sectional view of one of the track elements for the apparatus shown in Figs. 5 and 6.

Figure 1:
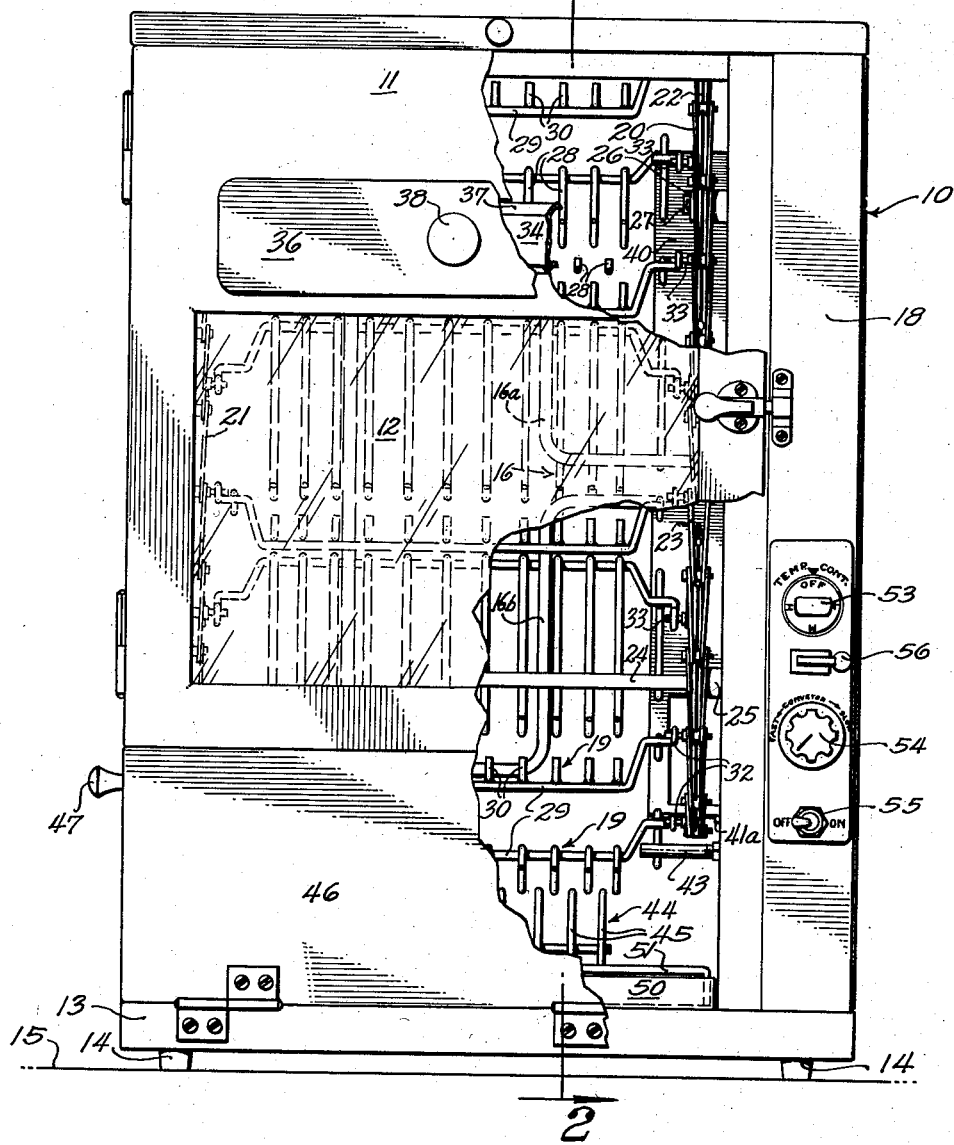
Figure 1 is an elevation of an apparatus incorporating the present inveniton, some of the parts being broken away.

In Fig. 1 there is shown a cabinet 10 housing the operative parts of the broiler. A door 11, forming the upper part of the front wall of the cabinet, serves as a means for gaining access to the interior thereof.

The door 11 carries a window 12 so that the working parts of the apparatus may be inspected during operation. The rear side of the cabinet 10 desirably includes a window of substantial area so that purchasers or prospective purchasers may view the cooking or broiling process. The base 13 of the cabinet 10 has feet 14 resting upon a suitable support 15.

Located within the cabinet is a heating unit comprising two heating rod elements 16 and 17. (See Fig. 2.) Each rod element generally is of looped configuration. The rod 16, for instance, includes an upper branch 16a and a lower branch 16b, the corresponding ends of which project into a hollow side wall 18 of the cabinet 10 for appropriate electrical connections. The ends of the branches 17a and 17b of the other heating rod element 17 similarly project into the side hollow wall 18.

The heating rod elements extend in spaced parallel vertical planes also parallel to the door 11. The units when energized define a region of concentrated heat between them.

A series of carriages 19, one of which is shown in

Fig. 4, pass endlessly downwardly into the heated region between the heating rod elements 16 and 17. For this purpose, a chain conveyor structure mounting the carriages is provided.

The conveyor structure is formed by a pair of endless sprocket chains 20 and 21 extending in spaced parallel vertical planes.

The sprocket chain 20, for instance (Fig. 2), extends about the outer elements of a first pair of vertically spaced upper and lower sprocket wheels 22 and 23 located adjacent the wall 18. Corresponding sprocket wheels are provided for the other sprocket chain 21 near the opposite wall. The lower sprocket wheels are coaxially mounted for movement in unison by a lower horizontal shaft 24. Appropriate bearing structures, such as 25 (see, also, Fig. 1), secured on the inside of the opposite sides of the cabinet, support opposite ends of the shaft 24.

A hub 26, carried by the upper sprocket wheel 22, is rotatably connected to a drive shaft 27 projecting inwardly from the side wall 18. The opposite upper sprocket wheel is supported for angular movement about an axis coaxial with the axis of the drive shaft 27.

A motor and an appropriate gear reduction mechanism serves to move the drive shaft 27. Movement of the sprocket wheel 22 by the drive shaft 27 causes both chains to move in unison. The conveyor chains are so located that the carriages suspended between them pass endlessly between the heating units 16, 17 along one vertical run of the conveyor. At the opposite run of the conveyor, the carriages pass vertically along the door 11.

The carriage structure 19, as shown most clearly in Figs. 3 and 4, comprises a series of tines or fingers 28 secured, as by welding, at corresponding ends to the intermediate offset portion of a supporting bar 29. The other corresponding ends of the tines are free, and have correspondingly upwardly bent ends 30. The series of tines 28 together form a flat grill upon which hamburger patties 31 (Fig. 2) or the like are adapted to rest.

The ends of the supporting bar 29 are formed to provide coaxial eyes 32 adapted respectively to receive correspondingly located pins 33 (Fig. 3) projecting inwardly of and carried by the respective sprocket chains 20 and 21. The sets of pins 33 are uniformly spaced along the conveyor structure, as shown in Fig. 2.

The carriages can easily be removed from or placed upon sprocket chains 20 and 21 by outwardly flexing those portions of the sprocket chains intermediate the sprocket wheels. By such flexure, at least one of the set of pins 33 may clear the corresponding eyes 32. To place the carriages on the conveyor, the door 11 is opened. The central portion of the vertical run near the door 11 is then accessible for this purpose. By moving the conveyor, successive portions thereof are accessible for such manipulations. The sprocket chains 20 and 21 are normally sufficient tensioned to ensure against accidental removal of the carriage structures.

Figure 2:
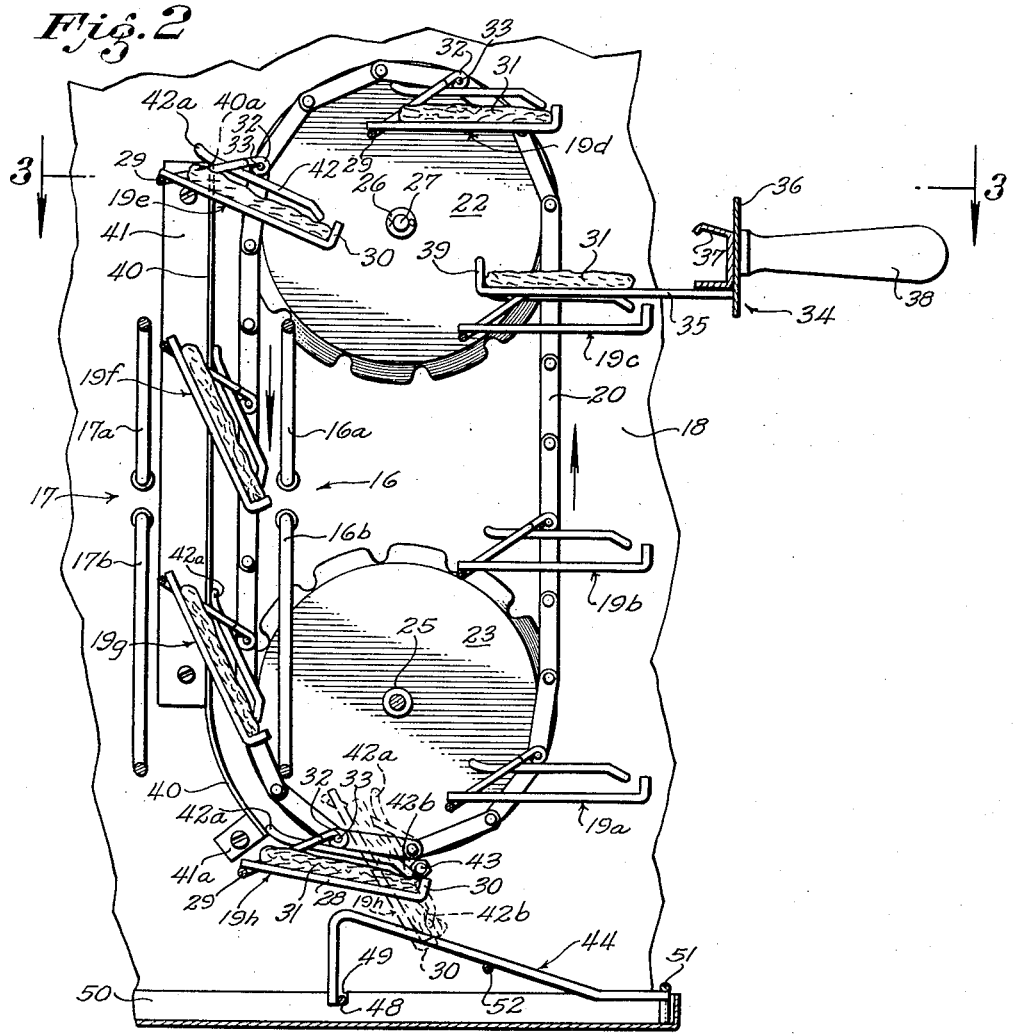
Fig. 2 is a vertical sectional view, showing a portion of the apparatus and taken along the plane indicated by line 2—2 of Fig. 1.

By imparting a counterclockwise movement to the drive shaft 27 as viewed in Fig. 2, the carriages are caused to pass downwardly between the spaced heating rod elements 16 and 17. The right-hand run of the conveyor structure moves upwardly.

Provisions are made to load the carriages 19 with one or two hamburger patties when traveling along the upper run of the conveyor. For this purpose, a loader structure 34 is provided. The loader structure 34 comprises a series of spaced tines or arms 35 (see, also, Fig. 3) secured to one side of a plate or support. A handle 38, secured to the plate 36 on the opposite sides, serves as a means whereby the loader 34 may be manipulated. The raw hamburgers are placed upon the tines 35 of the loader exteriorly of the cabinet 10. Correspondingly upwardly bent free ends 39 of the loader tines determine the correct position of the patties longitudinally of the tines. The loader 34 is then inserted into the cabinet 10 through an elongate horizontal aperture in the door 11.

A spring clip 37 located on the loader plate 36 snaps into engagement with the edges of the door aperture, and determines a precise operative position of the loader.

In order to cause transfer of the hamburger patties from the loader to the carriage, the tines 28 of the carriage 19 are caused to pass between the loader tines 35. Interpassage of the tines of the carriage and the loader is insured by accurately determining the lateral position of the loader in the door aperture through which the loader tines 35 extend. The clip 37 has only slight lateral clearance with the casing aperture for this purpose.

In order to effect transfer of the hamburger patties without distorting the shape thereof, the plane defined by the carriage tines 28 is caused to coincide with the plane defined by the loader tines 35 at the instant of interpassage of the tines. Conveniently this relationship is achieved by so suspending the carriage that the tines normally assume a horizontal orientation, the loader also having a horizontally orientation. For this purpose, the axis of mounting of the carriage 19 is located substantially midway of the length of the carriage tines and substantially above them. The upwardly bent ends 30 of the tines substantially counterbalance the supporting bar 29 at the opposite ends of the tines. Accordingly, a stable orientation of the carriage is provided.

At the moment of passage of the carriage through the loader, the tines of the respective structures extend in side-by-side aligned relationship throughout substantial portions of their lengths. The hamburger patties are very accurately transferred to the carriage so that the weight of the hamburger patties is substantially equally disposed on opposite sides of the axis of the mounting of the carriage. Accordingly the weight of the patties does not tend to turn the carriage away from its normal horizontal orientation. However, precise placement is not critical since the carriage axis is substantially above the plane of the carriage, and any eccentricity would not cause a material inclination.

The carriages then pass upwardly about the upper sprocket wheels and stay in a horizontal orientation until slightly in advance of the downward run. When the carriage is passed between the heating rod elements, they are tilted to a more nearly vertical orientation so that the patties receive substantial radiation on opposite surfaces. Also, angularly moving the plane of the carriage grill toward the direction in which the conveyor travels makes it possible to locate the heating rod elements 16 and 17 quite close together to intensify the heat.

Before the hamburger patties are moved to a more vertical orientation for passage between the heating rod elements, they are partially cooked. Heated air within the cabinet 10 rises to the top of the space enclosed thereby. The outer element of the upper sprocket wheels are situated close to the top of the cabinet structure, as shown in Fig. 1, to make use of this heated air for partially cooking the patties. The hamburger patties achieve a consistency, when they are horizontally oriented, sufficiently coherent to prevent them from sagging under their own weight when they are moved to a vertical orientation.

For turning the carriages 19, a guiding track 40 is provided that follows the path of the conveyor chain 20. The track 40 is formed as an elongate integral flange extending at right angles from an edge of a base portion 41. This base 41 is secured to the inside of the side wall 18 by suitable fastening means. The track 40 extends partially along the curved portion of the chain path at the lower sprocket wheel 23 before the track 40 terminates. To permit the track to assume this configuration, an integrally formed foot 41a at the end of the free portion of the track 40 is secured to the wall 18 to hold the track in an appropriately flexed position.

Each carriage 19 carries a guide pin 42 secured, as by welding, to that end of the support 29 which passes along the track 40. The guide pin 42 is so oriented that its left-hand end 42a would normally describe a line spaced a certain constant distance from the axis of mounting of the carriage. The upper edge 40a of the track 40 is in the path of downward movement of the pin end 42a, the track 40 being spaced from the eyes 32 at a certain lesser distance. This relationship causes the carriage to tilt to a more nearly vertical orientation. The carriage 19e shown in Fig. 2 is in the process of being tilted to a more nearly vertical orientation by virtue of engagement between the end edge 40a and the guide pin 42. Upon sufficient downward movement of the carriage 19e, for instance, the end 42a of the guide pin 42 clears the end edge 40a of the track 40 and moves into engagement with the surface of the track, which, through engagement with the pin 42, restrains movement of the carriage back to its normal horizontal orientation. The adjacent carriages 19f and 19g are shown in a nearly vertical orientation, the pins 42 of these carriages being in engagement with the track 40.

The weight of the loaded carriages tends to move the carriages in a counterclockwise direction about their axes of pivotal movement. The guide pins 42 when in engagement with the track 40 prevent such movement. By accurately locating the track, a certain angular orientation of the hamburger patties is determined.

The upwardly bent ends 30 of the carriage tines prevent the hamburger patties from sliding off the carriages when they are so oriented.

The carriage 19a shown in Fig. 2 has a guide pin still in engagement with the track 40. However, this carriage is in substantially horizontal orientation due to the change in the path of the conveyor and the track 40.

To discharge the patties 31, the carriage is inverted when it reaches this position beneath the lower sprocket wheels. For this purpose, a tripping pin 43 is provided. This pin 43 is in the path of movement of the forwardly projecting end 42b of the carriage guide pin 42. This end 42b of the guide pin 42 is opposite that which engages the track 40, and is inclined downwardly with respect to the direction of movement of the carriage 19h when the guide pin 42a is about to pass beyond the track 40. The tripping pin or projection is located only slightly beneath the lower sprocket 23, and first engages the inclined end 42b when the axis of the carriage is spaced substantially from the tripping pin 43. Continued movement of the conveyor structure, as shown by the phantom-line position in Fig. 2, causes the guide pin 42 to move beneath the pin 43, rotating the carriage in a clockwise direction about its axis. When the eyes of the carriage pass over the tripping projection, the tripping projection 43 causes a vertical orientation of the pin 42, and hence a vertical orientation of the carriage, the guide pin being substantially parallel to the carriage tines 28. Further movement of the conveyor causes continued rotation of the carriage, and actual inverting of the carriage. The tripping pin 43 engages the guide pin until the axis of the carriage has moved substantially beyond the tripipng pin, as shown by the full-line position in Fig. 2a.

Since the tripping pin 43 is operative throughout a substantial travel of the carriage, and since it is located quite close to the path of movement of the eyes forming the carriage axis, the pin 43 causes almost complete inverting movement of the carriage.

The hamburger patties 31 are thus caused to be discharged from the carriage 19h.

The hamburger patty 31 falls upon an inclined rack 44 formed by a series of spaced parallel angled bars 45. (See, also, Figs. 1 and 3.) A door 46, hinged to a bottom wall 13 of the casing 10 and manipulable by a handle 47, may be opened by the operator in order to remove the hamburger patties from the rack 44.

As shown most clearly in Figs. 2 and 3, the angled bars 45 forming the rack 44 have corresponding ends secured to a supporting bar 48, the bars extending vertically upwardly to intermediate bent portions forming crests 45a. The bars 45 then slope downwardly toward the right, and are secured to a supporting bar 51. The opposite ends of the supporting bar 48 are received in recesses 49 at opposite sides of a shallow drip pan 50. The other supporting bar 51 rests upon the bottom of the drip pan 50. An intermediate reinforcing transverse bar 52 is located intermediate the inclined portions of the bars 45.

Figure 2A:
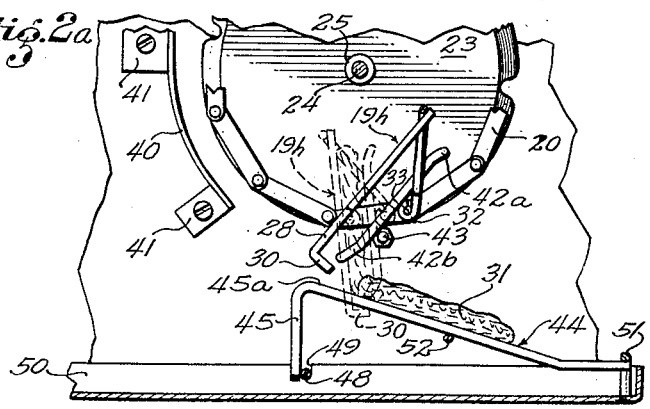
Fig. 2a is a fragmentary view similar to Fig. 2, showing that portion of the apparatus which causes the food articles to be removed from the carriages, the full-line and phantom-line positions of the carriage being shown in successive unloading positions.

As shown by the phantom-line positions of the carriage 19h in Figs. 2 and 2a, the ends of the tines 28 of the carriage pass between the spaced parallel bars 45 of the rack 44 at the crests thereof during movement of the carriage between the full-line position of Fig. 2 and Fig. 2a. Such movement of the ends of the tines 28 with respect to the rack 44 causes the hamburger patties to be forced loose from the carriage in advance of the actual inverting movement of the carriage 19h. This feature ensures that the hamburger patties will not stick to the carriage.

The angled bars 45 must be accurately located with respect to the carriages in order to ensure appropriate interpassage of the carriage tines 28 and the bars 45 of the rack 44. This is achieved by accurately locating the rack 44 with respect to the drip pan 50. For this purpose, the supporting bar 51 accurately fits between opposite side walls of the drip pan 50. Also for this purpose, the drip pan 50 itself accurately fits in the bottom of the cabinet 10 between the opposite side walls thereof.

When the carriage guide pin 42 finally clears the tripping pin 43, the carriage assumes its normal horizontal orientation. This is exemplified, for instance, by the carriages 19a and 19b shown in Fig. 2. The cycle of operation is then repeated.

Appropriate controls are provided for the operating mechanism enclosed within the hollow wall 18. A switch 53 controls the energization of the heating rod elements 16 and 17. This switch in addition to an off position has several positions corresponding to high, medium and low heat. A knob 54 controls the motor circuit which drives the conveyor structure, and may operate a controlling device which varies the speed of the motor. A master switch 55 is also provided.

A lever 56 selectively disconnects the motor from the conveyor structure. This makes it possible for the operator quickly to move the conveyor structure thereof to any desired position. This is accomplished by exerting upward pressure, for instance, on one of the pins mounting the carriages. Optionally, a hand-operated crank accessible exteriorly of the cabinet could be provided. The unclutching feature makes it possible to keep the hamburger patties warm by placing them between the heating rod elements 16 and 17 at a low heat. The clutching feature also makes it possible to achieve opposite extreme degrees of cooking beyond that normally provided by adjustment of the knob 54.

In the form of the invention shown in Figs. 5, 6 and 7, a conveyor and carriage structure operating on a slightly different principle is provided. As shown in Figs. 5 and 6, a plurality of carriages are mounted between a pair of parallel, vertically disposed, spaced sprocket chains 102a, 102b, in a manner similar to that of the previous form. The carriages 101 form with the chains 102 a conveyor structure for appropriately carrying the hamburger patties 100.

The patties 100 are loaded upon the carriages 101 on the upward run at the right-hand portion of the apparatus, as shown in Fig. 5. The carriages 101 on the downward run at the left of the apparatus in Fig. 5 pass between heating elements (not shown), as in the previous form.

Each carriage 101 comprises a supporting member 103 having an intermediate offset portion 104. (Fig. 6.)

The ends 105 of the supporting member 103 have aligned and outwardly opening recesses in which correspondingly located pins 106 of the sprocket chain elements 102 are received. By the aid of these pins 106, the carriage structure 101 is pivotally mounted on the sprocket chains 102 for movement about a horizontal axis. The carriage 101 may be detached from or operatively spaced between the sprocket chains 102 by relative outward flexure of the sprocket chains 102, as in the previous form.

Extending from and secured to the offset portion 104 are a plurality of food supporting tines or arms 107. These arms 107 are uniformly spaced from each other and extend in parallel relationship in the plane of the off-set portion 104. The hamburger patties 100 rest upon the arms 107.

The free ends 108 of the arms 107 are correspondingly upwardly bent to form a restraint limiting sliding movement of the hamburger patty 100 placed thereon. The arms 107 extend transversely of the axis of pivotal mounting of the carriage 101, and their free ends 108 are spaced a distance from this axis in an amount substantially greater than the spacing of the secured ends therefrom.

The arms 107 locate the center of gravity of the carriage 101 eccentrically of the axis of pivotal mounting and close to the plane defined by the arms 107. Accordingly, if the arms 107 are disposed substantially horizontally, the weight of the carriage 101 tends to turn it angularly in a clockwise direction, as viewed in Fig. 5. When the carriage is free of restraint, it occupies a position generally exemplified by the carriage 101a. The supporting surface defined by the arms 107 is then slightly inverted and the carriage 101 is in discharging position.

In order to maintain the carriage 101 in a supporting position, stationary track means are provided. A track 109, formed on an extended side of an elongate channel structure 110, maintains the carriage 101 in an appropriate food supporting position during its movement along the downward run. The channel 110 is located along the downward run of one of the sprocket chains 102a. The channel 110 serves as a guide for the sprocket chain 102a.

This track 109 cooperates with a guide pin 111 secured to the corresponding end 105 of the supporting member 103 of the carriage 101. The track 109 is so located with respect to the free end of the guide pin 111 and the path of travel of the axis of pivotal movement of the carriage 101 as to maintain the carriage 101 in a food supporting position. The guide pin 111 and the track 109 cooperate to maintain the arms 107 in a position sufficiently inclined to the vertical to ensure retention of the hamburger patty 100 thereon. This inclination from the vertical is sufficiently small to expose opposite surfaces of the hamburger patty 100 to the radiation of the heating elements disposed on opposite sides of the carriage.

The track 109 is of a length sufficient such that it is operative to maintain the carriage 101 in a food retaining position during the entire period in which the carriage 101 passes between the heating elements. When the pin 111 clears the lower terminal portion 112 of the track 109, the carriage 101 is free to turn about its pivotal mounting. Accordingly, the patty 100 is discharged after being appropriately cooked.

In order definitely to ensure inverting movement of the carriage 101, a tripping projection 113 is provided. This tripping projection 113 is in the path of movement of the guide pin 111 and substantially completely inverts the carriage structure 101. It is thereby ensured that should the paties 100 stick to the arms 107 and not be discharged immediately after passage of the guide pin 111 from the lowermost terminus 112 of the guide 109, they will be discharged immediately thereafter by fully inverting the carriage 101.

The empty carriage structures 101 pass about the lower portion of the conveyor structure and begin to travel along the upward run thereof. During this upward run, the hamburger patties 100 are trensferred from a loader structure 114 that is quite similar to the loader of the previous form.

The patties 100 are positioned on a loader platform formed by a series of arms or tines 115. These arms 115 project from a transverse frame element 116 of the loader structure 114. The ends of the arms 115 of the loader structure project toward the offset portion 103 of the carriage 101. The arms 115 of the loader structure 114 are appropriately interspaced between the arms 107 of the carriage structure 101.

Horizontally extending, spaced, parallel, and opposed channels 120 extend inwardly of the housing from opposite ends of the aperture 118. Lateral frame elements 117 of the loader structure 114 are respectively guidingly accommodated in the channels 120. These channels 120 accurately define the lateral position of the arms 115 of the loader structure. The inwardmost position of the loader 114 is determined by engagement of a plate 121 with the edges about the housing aperture 118.

A handle 122 secured to the plate 121 serves as a means whereby the loader structure 114 may be inserted or retracted.

In order effectively to accomplish transfer of the hamburger patties 100 from the loader 114 to the carriage 101, the arms 107 of the carriage are located substantially in a horizontal plane during such transfer. By virtue of this arrangement, it is ensured that the hamburger patty 100 is quickly, accurately and effectively transferred.

In order to ensure such substantially horizontal disposition of the arms 107 of the carriage 101, a track 123 is provided. This track 123 is formed near the end of an extended side of an elongate channel structure 124. This track 123 cooperates with a supplemental guide pin 125 carried on the carriage structure 101. The operative portion of the track 123 is spaced inwardly of the apparatus as compared with the track 110 on the downward run. The extended side of the channel 124 forming the track 123 is, accordingly, of greater width. The supplemental guide pin 125 is correspondingly located on the end of the supporting member 103 of the carriage 101, and is spaced inwardly of the other guide pin 111 (see Fig. 6).

The main guide pin 111 is located in a vertical plane angularly between the auxiliary guide pin 125 and the food supporting arms 107. The auxiliary guide pin 125 extends generally in a direction normal to the food supporting arms in a direction beneath the food supporting surface defined thereby. Accordingly, the lower end 126 of the track 123 first engages the auxiliary guide pin 125 and causes the carriage 101 to assume a substantially horizontal position.

As soon as transfer of the patty 100 is effected, the track 123 permits movement of the carriage 101 to an inclined position. The upper end 127 of the track 123 is deflected rearwardly to permit gradual angular movement of the carriage 101 under the influence of its weight as the carriage progresses upwardly. Upon sufficient angular movement of the carriage 101, the guide pin 111 maves into operative position with a track 128.

This track 128 is conveniently formed as integral part of the elongate channel structure 124, and is spaced outwardly of the track 123. The track 128 is appropriately curved to ensure that the carriage 101 is in food supporting relationship as it moves arcuately about the upper portion of the conveyor.

Before the guide pin 111 leaves the upper treminus 129 of the track 128, a generally horizontal transfer track 130 is effective to maintain the carriage 101 in operative position. This track 130 is spaced above the other conveyor chain 102b, and is conveniently located above and along the uppermost portion thereof. This transfer track 130 cooperates with a transfer guide pin 131 located on the end 105 opposite the end on which the other guide pins 111 and 125 are accommodated.

The transfer guide pin 131 extends generally in the plane of the support provided by the carriage 101 and in a direction along the offset portion 104. It terminates in a curved projection beyond the end of the offset portion that engages the lower surface of the transfer track 130. The carriage is thereby prevented from moving to discharging position. The transfer track 130 is so located that it is in operative position with respect to the transfer pin 131 before the main guide pin 111 leaves the end 129 of the track 128.

The end 132 of the transfer track 130 has a sufficiently small curvature and so spaced from the sprocket chain that when the axis of pivotal mounting of the carriage 101 arrives at the point P at the beginning of the downward run, the transfer track 130 is ineffective to restrain angular movement of the carriage in a clockwise direction. Such angular movement is limited by engagement of the guide pin 111 with the track 109, and the carriage 101 is in operative position for movement along the downward run.

As shown in Fig. 7, the bottom of channel 124 is flared inwardly at a place 134 corresponding to loading of the carriages 101. Since the channel 124 also acts as a guide for the conveyor chain 102a, this inwardly flared portion 134 moves the chains 102a and 102b toward each other in an amount sufficient to take up the lateral slack in the pivotal mounting of the carriage 101. By these means a definite interspaced relationship is achieved between the arms of the carriage and the arms of the loader.

The edge 133 of the track 109 is spaced outwardly of the auxiliary guide pin 125, as shown most clearly in Fig. 6. Accordingly, the auxiliary guide pin 125 does not interfere with the appropriate coaction between the guide pin 111 and the track 109.

The loader 114 places the hamburger patties 100 eccentrically of the carriage structure 101, as shown most clearly in Fig. 6. The weight of the patty thus cooperates with the eccentric center of gravity of the carriage 101 to ensure proper movement of the carriage 101 to food discharging position.

The apparatus shown in Figs. 5, 6, and 7 may be provided with suitable controls for controlling the degree of energization of the heating units, for varying the speed of the conveyor structure, and for disconnecting the conveyor from the motor drive.

The inventor claims:

1. In apparatus for cooking food: an endless conveyor structure having a vertical upward run and a vertical downward run; a food carriage comprising a series of parallel tines, a common support for corresponding first ends of the tines, the other ends of the tines being free, the operative portions of the tines extending substantially in a plane; means pivotally mounting the carriage on the conveyor about a horizontal axis transverse to the tines, the axis of the pivotal mounting being so located that said plane is substantially horizontal; a feeler member carried by the carriage; a track cooperable with the feeler member during the vertical downward run of the conveyor for inclining said plane toward the vertical; an arm carried by the carriage; a tripping projection cooperable with the arm for inverting the carriage upon advancement thereof; and a collection rack comprising a series of bars between which the free ends of said tines pass during inverting movement of said carriage.

2. In apparatus for cooking food: an endless conveyor structure having a vertical upward run and a vertical downward run; a food carriage comprising a series of parallel tines, a common support for corresponding first ends of the tines, the other ends of the tines being free, the operative portions of the tines extending substantially in a plane; means pivotally mounting the carriage on the conveyor about a horizontal axis transverse to the tines, the axis of the pivotal mounting being so located that said plane is substantially horizontal; a loader comprising a series of horizontal parallel elements between which the carriage tines pass during the vertical upward run; a feeler member carried by the carriage; a track cooperable with the feeler member during the vertical downward run of the conveyor for inclining said plane toward the vertical; an arm carried by the carriage; a tripping projection cooperable with the arm for inverting the carriage upon advancement thereof; and a collection rack comprising a series of bars between which the free ends of said tines pass during inverting movement of said carriage.

3. A carriage for supporting articles of food on a conveyor structure, comprising: a supporting bar having ends each extending at an angle to the central portion of the bar; a series of substantially straight tines secured at corresponding first ends to the central portion of the bar, the other ends of the tines being free; the operative portions of the tines extending substantially in a plane; the ends of the supporting bar having provisions for pivotal attachment of the carriage to said conveyor, the axis of pivotal movement determined by said provisions being parallel to said plane and transverse to said bars, said axis extending on one side of said plane and so located that when said carriage is free to move about said axis, said plane is substantially horizontal; and a pin secured to one of said ends of said supporting bar, and having ends extending on opposite sides of the axis determined by said provisions, one end of said pin being cooperable with a track for determining a position of said carriage in which said plane is inclined, the other end of said pin being cooperable with a tripping projection for inverting said carriage.

4. In apparatus for cooking food: a conveyor structure comprising a pair of upper horizontally coaxial wheels and a pair of lower horizontally coaxial wheels; endless flexible members each cooperable with an upper wheel and the corresponding lower wheel; a carriage for supporting articles of food and having supporting elements, the operative portions of which extend substantially in a common plane; means pivotally suspending the carriage between corresponding portions of said flexible member; a feeler member carried by said carriage; and a track substantially paralleling a portion of the path of one of said flexible members and cooperable with said feeler member to incline said plane to the horizontal; said axis of pivotal suspension being so located with respect to the carriage that unless restrained, said plane is substantially horizontal.

5. In apparatus for cooking food: a conveyor structure comprising a pair of upper horizontally coaxial wheels and a pair of lower horizontally coaxial wheels; endless flexible members each cooperable with an upper wheel and the corresponding lower wheel; a carriage for supporting articles of food and having supporting elements, the operative portions of which extend substantially in a common plane; means pivotally suspending the carriage between corresponding portions of said flexible member; a feeler member carried by said carriage; and a track substantially paralleling a portion of the path of one of said flexible members and cooperable with said feeler member to determine an angular position of said carriage, said track comprising a flange integrally formed at one side of a base, the flange having an extension located beyond the end of the base, the terminal portion of said flange extension having a foot, said foot and said base being adapted to be secured to a wall, the position of said foot with respect to the base determining a curvature of said extension so that said extension parallels the curved path of the corresponding flexible member about one of said wheels.

(References on following page)

References Cited in the file of this patent

UNITED STATES PATENTS

| | | |
|---|---|---|
| 975,181 | Turnbull | Nov. 8, 1910 |
| 1,250,540 | Young | Dec. 18, 1917 |
| 1,423,765 | Hastings | July 25, 1922 |
| 1,634,142 | Hammond | June 28, 1927 |
| 1,773,109 | McCaig et al. | Aug. 19, 1930 |
| 2,001,703 | Brown | May 21, 1935 |
| 2,172,194 | Ehrgott | Sept. 5, 1939 |
| 2,718,188 | Read et al. | Sept. 20, 1955 |

FOREIGN PATENTS

| | | |
|---|---|---|
| 394,229 | Germany | Apr. 14, 1924 |